Figure 1:
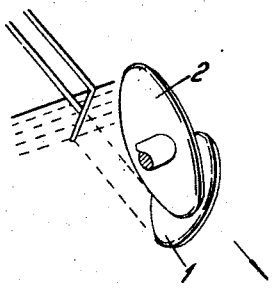
Figure 2:
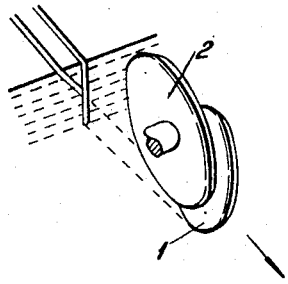
Figure 3:
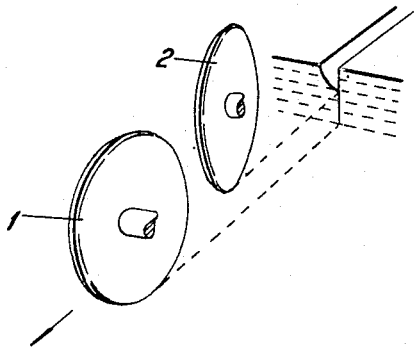
Figure 4:
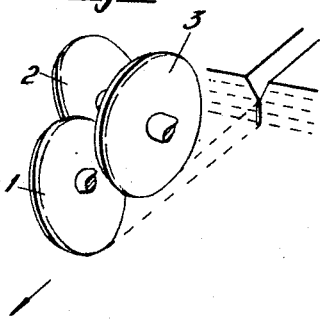
Figure 5:
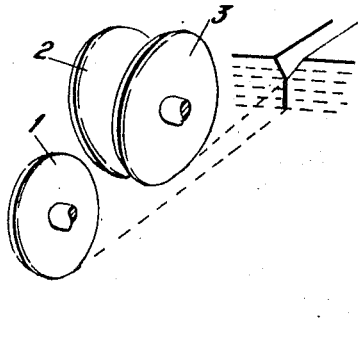
Figure 6:
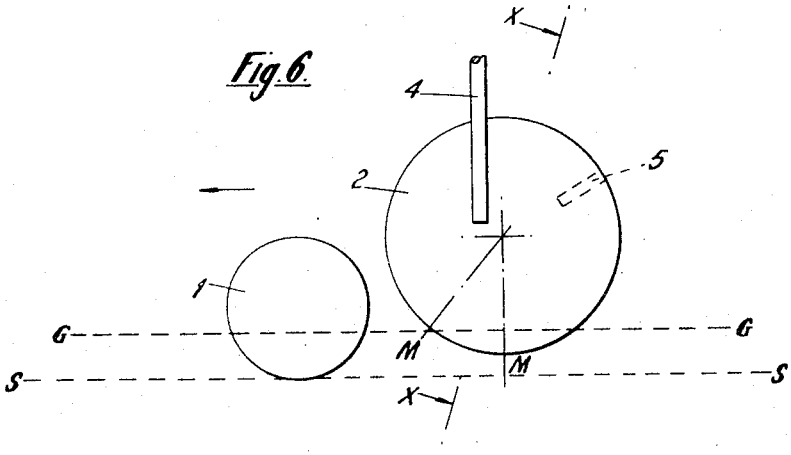
Figure 7:
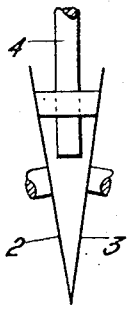
Figure 8:
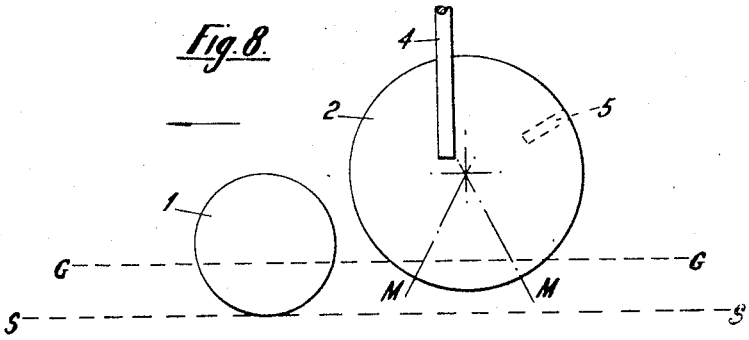
Figure 9:
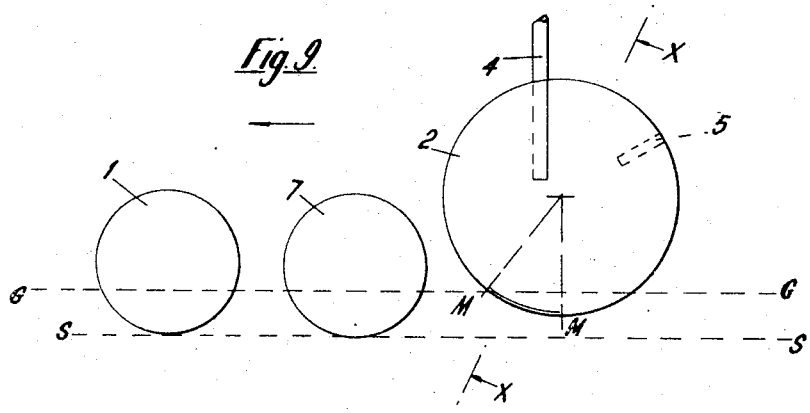
Figure 10:
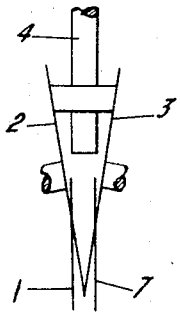
Figure 11:
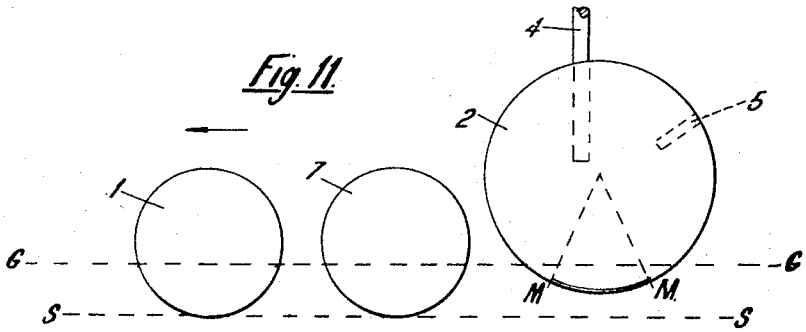
Figure 12:
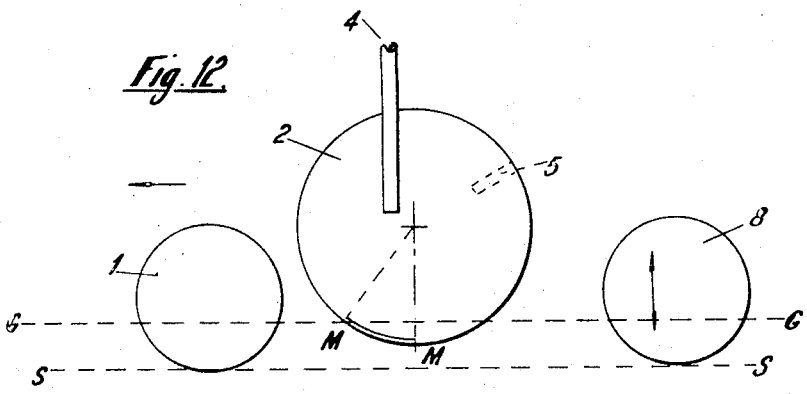
Figure 13:
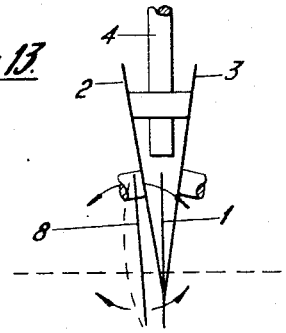
Figure 14:
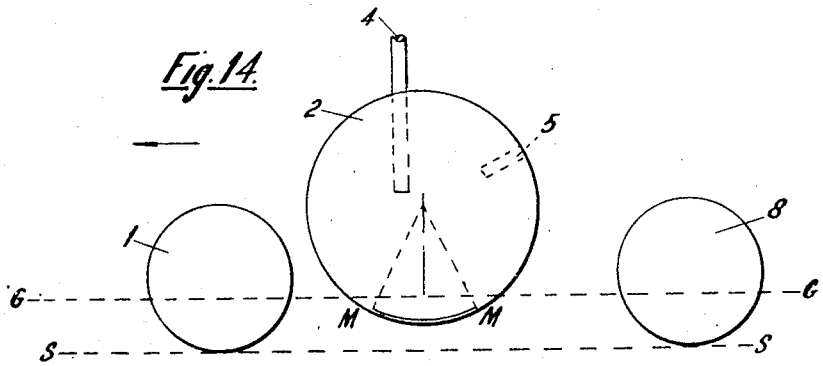

T 862011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 24

777,309

AGRICULTURAL DEVICE

Paul Koronka and David Alan Harris, Fernhurst, Haslemere, England, assignors to Imperial Chemical Industries Limited, London, England, a corporation of Great Britain

Filed Nov. 20, 1968. Published May 6, 1969
Int. Cl. A01c *5/06;* A01b *5/16*
U.S. Cl. 111—88
4 Sheets Drawing. 13 Pages Specification

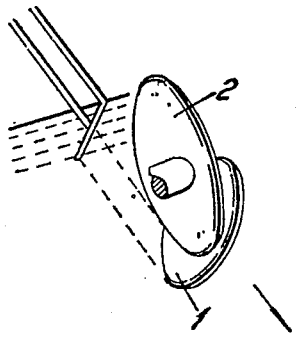

A coulter device is provided for use on a plow which is particularly adapted for use with seed drills and which is capable of cutting through vegetation or other trash to form a slit in the ground into which seed may be sown. The coulter device of this invention comprises a rotatable slit-cutting disc of from 4 to 12 inches in diameter to cut a slit in the ground and a pair of rotatable slit widening discs of from 6 to 12 inches in diameter arranged rearwardly of said slit-cutting disc to widen the slit so formed, the slit-widening discs having a greater diameter than the slit-cutting disc.

May 6, 1969

P. KORONKA ET AL

AGRICULTURAL DEVICE

Filed Nov. 20, 1968

DEF. PUB. T 862011

SN - 777309

Sheet 1 of 4

Inventors
PAUL KORONKA
DAVID ALAN HARRIS
By
Cushman, Darby & Cushman
Attorneys

Inventors
PAUL KORONKA
DAVID ALAN HARRIS
By
Cushman, Darby & Cushman
Attorneys

Inventors
PAUL KORONKA
DAVID ALAN HARRIS
By
Cushman, Darby & Cushman
Attorneys

Inventors
PAUL KORONKA
DAVID ALAN HARRIS
By
Cushman, Darby & Cushman
Attorneys